US007765708B2

(12) United States Patent
Hellier

(10) Patent No.: US 7,765,708 B2
(45) Date of Patent: Aug. 3, 2010

(54) METHOD FOR MEASURING AN OBJECT

(75) Inventor: Peter Kenneth Hellier, Dursley (GB)

(73) Assignee: Renishaw PLC, Wotton-under-Edge (GB)

( * ) Notice: Subject to any disclaimer, the term of this patent is extended or adjusted under 35 U.S.C. 154(b) by 121 days.

(21) Appl. No.: 12/227,895

(22) PCT Filed: Jun. 6, 2007

(86) PCT No.: PCT/GB2007/002058

§ 371 (c)(1),
(2), (4) Date: Dec. 2, 2008

(87) PCT Pub. No.: WO2007/141509

PCT Pub. Date: Dec. 13, 2007

(65) Prior Publication Data
US 2009/0235547 A1    Sep. 24, 2009

(30) Foreign Application Priority Data
Jun. 6, 2006   (GB) .................................. 0611109.0

(51) Int. Cl.
G01B 5/004    (2006.01)
(52) U.S. Cl. ...................................................... 33/503
(58) Field of Classification Search .................. 33/502, 33/503, 556
See application file for complete search history.

(56) References Cited

U.S. PATENT DOCUMENTS

| 4,831,741 | A |   | 5/1989  | Sogoian |         |
|-----------|---|---|---------|---------|---------|
| 4,901,256 | A | * | 2/1990  | McMurtry et al. | 33/503 |
| 4,931,658 | A |   | 6/1990  | Tole    |         |
| 5,016,199 | A | * | 5/1991  | McMurtry et al. | 33/503 |
| 5,165,269 | A | * | 11/1992 | Nguyen  | 33/356  |
| 5,212,646 | A | * | 5/1993  | McMurtry | 33/504 |
| 5,341,574 | A | * | 8/1994  | Bieg    | 33/502  |
| 5,898,590 | A | * | 4/1999  | Wampler et al. | 33/504 |
| 6,161,079 | A | * | 12/2000 | Zink et al. | 33/504 |
| 6,434,846 | B1 | * | 8/2002 | McMurtry et al. | 33/502 |

(Continued)

FOREIGN PATENT DOCUMENTS

GB    1 445 977    8/1976

(Continued)

*Primary Examiner*—G. Bradley Bennett
(74) *Attorney, Agent, or Firm*—Oliff & Berridge, PLC

(57) ABSTRACT

A 'go, no-go' method is described for determining whether the dimensions of an object, such as a workpiece, conform to tolerance. The method uses a measurement probe, such as a touch trigger, analogue, or non-contact probe, mounted on a measuring apparatus such as a coordinate measuring machine, machine tool, or a lathe. The method comprises the step of driving the measurement probe around a path relative to the object, said path being based on a tolerance of the object. The path relative to the object may include at least a first path based on the maximum tolerance of the object and a second path based on the minimum tolerance of the object. The method additionally comprises the steps of monitoring any probe measurement data acquired by the measurement probe as the probe is driven around the path, and indicating if the dimensions of the object do not conform to tolerance only if there is a change in state of the probe measurement data that is acquired as the measurement probe is driven around the path.

20 Claims, 6 Drawing Sheets

U.S. PATENT DOCUMENTS

| | | | |
|---|---|---|---|
| 6,568,242 B2 * | 5/2003 | Nai | 33/502 |
| 6,668,466 B1 * | 12/2003 | Bieg et al. | 33/503 |
| 6,785,973 B1 * | 9/2004 | Janssen | 33/763 |
| 2007/0033819 A1 | 2/2007 | McFarland | |
| 2009/0307915 A1 * | 12/2009 | Sutherland | 33/502 |

FOREIGN PATENT DOCUMENTS

| | | |
|---|---|---|
| GB | 1 551 218 | 8/1979 |
| WO | WO 2005/031254 A1 | 4/2005 |

* cited by examiner

METHOD FOR MEASURING AN OBJECT

The present invention relates to the use of measuring apparatus to determine whether or not the dimensions of an object conform to tolerance. In particular the invention relates to a method for determining whether the dimensions of an object conform to tolerance using a measurement probe mounted on coordinate positioning apparatus.

A conventional method for checking that objects conform to tolerances involves the use of 'go, no go' gauge blocks, as illustrated in FIG. 1. Such 'go, no go' gauge blocks typically deal with plug, ring, taper, snap and thread shapes and are reliable for tolerances down to about 0.05 mm. The 'go' gauge 26 must be able to either slip inside a machined bore 30 without obstruction, as in the case of FIG. 1, or in reverse, over a machined protrusion without obstruction; if it does not, the object is above its maximum material condition. The 'no go' gauge 24 must not be able to slip inside a machined bore, in the case of FIG. 1, or over a protrusion, if it can the object is below its minimum material condition.

A disadvantage of this method arises from the fact that the gauges themselves must have assigned tolerances, as they too are manufactured. All gauge tolerances must fall within the work tolerance zones to ensure that no out of tolerance (bad) objects are accepted; however, this means that some good objects will be rejected. Another disadvantage of this method is the time taken to check the objects, as each gauge must be manually maneuvered into place. To prevent bad objects from passing incorrectly a 'go' gauge should be used to check only one size or shape of feature, and a 'no go' gauge should be used to check only one aspect of any feature (i.e. the length and width of a rectangle should be checked separately).

The 'go, no-go' gauge blocks give pass/fail results. If the object fails, the gauge block gives no information as to why it failed. If, for example, a tool had gone blunt whilst cutting, causing a cutting error, it would be useful to know the exact point at which this occurred; however, this information cannot be obtained from the gauge blocks.

Another known method for checking that objects conform to tolerances involves inspection of the object using coordinate positioning apparatus such as a machine tool. The objects inspected by machine tools are often workpieces which have been machined by a machine tool. A machine tool has a spindle onto which a probe (contact or non-contact) is mounted; the spindle can be driven in three orthogonal directions X, Y, Z within a working volume of the machine.

Contact probes, including touch trigger and analogue probes, typically comprise a housing with a workpiece-contacting stylus deflectable with respect to the housing. In a touch trigger probe, deflection of the stylus from a rest position causes a signal to indicate that the stylus has touched the surface of the workpiece (see for example patent number GB1445977). In an analogue probe the deflection of the probe is continuously measured as the stylus is moved along the surface of the workpiece (see for example patent number GB1551218). Of course an analogue probe can be connected to a digital processor to give a digital output.

Non-contact probes are positioned close to the surface of the workpiece without touching. The probe detects the proximity of the surface using, for example, capacitance, inductance or optical means.

For each feature, contact and non-contact probes relay a substantial amount of dimensional measurement data to a controller (which may comprise a computer programme). For example, analogue probes relay thousands of dimensional measurements. Together with the machine positional information, the probe measurement data allows the controller to build up an accurate picture of the dimensions of the workpiece. In order to assess whether a workpiece is in tolerance or not, the dimensional measurements acquired by the probe must be compared to the desired measurements of the workpiece.

The feature must be measured at a slow enough speed for data to be collected from each point at which the probe is deflected on the feature. In some types of coordinate positioning apparatus, such as machine tools, the probe is battery operated and measurement data is sent from the probe to a controller via a wireless link, for example an optical or radio link. These communication signals use up battery power. Due to the substantial number of points to be measured and thus data to be relayed, the whole process consumes a lot of battery power and time.

According to the present invention a method of determining whether the dimensions of an object (such as a workpiece) conform to tolerance using a measurement probe on a measuring apparatus comprises the following steps:

driving the measurement probe around a path relative to the object, said path being based on a tolerance of the object;

monitoring any probe measurement data acquired by the measurement probe as said probe is driven around said path; and indicating if the dimensions of the object do not conform to tolerance only if there is a change in state of the probe measurement data that is acquired as said measurement probe is driven around said path.

The method may be performed using a contact probe. In a contact probe, such as a touch trigger probe, the change in state of the probe measurement data acquired by the measurement probe may be a change between the deflected and undeflected probe conditions.

The contact probe may also comprise an analogue probe. The change in state of the probe measurement data for an analogue probe could occur for example: when the probe measurement data changes from within a predetermined measurement range to outside of that range; or when the probe measurement data crosses a predetermined measurement value threshold.

A change in state between the deflected and undeflected conditions in an analogue probe occur where the probe deflection measurement crosses a predetermined deflection measurement value threshold. For example, the deflected condition occurs when the deflection of the probe is greater than the predetermined deflection measurement value threshold; and the undeflected condition occurs when the deflection of the probe is smaller than the predetermined deflection measurement value threshold.

The method may also be performed using a non-contact probe. In non-contact probes, a change in state of the probe measurement data occurs for example when the probe measurement data changes from within a predetermined measurement range to outside of that range; or when the probe measurement data crosses a predetermined measurement value threshold.

Advantageously, the predetermined measurement range is dependent on at least one tolerance of the object. Preferably, the predetermined measurement value threshold is dependent on at least one tolerance of the object.

The tolerance of the object defines the maximum and minimum size of object which is acceptable. For example, for a cylinder the minimum tolerance will be a smaller diameter concentric cylinder and the maximum tolerance will be a larger diameter concentric cylinder. The path which the measurement probe is driven around is based on a tolerance of the object, i.e. the probe is moved through the coordinates defining a tolerance of the object or the probe is moved through coordinates offset from the coordinates defining a tolerance of the object.

The method of the present invention is faster and more versatile than the prior art 'go, no-go' gauge blocks described above. A probe can measure any number of features at once in 'go' or 'no-go' mode, whereas the 'no-go' blocks can check only one aspect of a feature at a time to avoid bad objects falsely passing inspection. The invention also overcomes the problem of rejecting good parts due to the tolerances in the gauge blocks themselves. Using the present invention it is also possible to determine the exact point at which the object fails the tolerance test, this is not possible using simple gauge blocks.

Advantageously, the step of monitoring any probe measurement data acquired by the measurement probe as said probe is driven around said path is carried out in the probe itself. In other words the measurement probe may comprise a checking unit for performing the step of monitoring probe measurement data acquired by the measurement probe as said probe is driven around said path.

This has the advantage that when employing a wireless analogue or non-contact probe it uses significantly less battery power and is much faster than traditional probing methods; this is due to the need to send signals only when the test fails. Consequently only a few signals are sent, if any, when testing the tolerance of an object. This saves a significant amount of data transfer compared to the thousands of signals needed to create an accurate three-dimensional image, thus saving on battery power.

Alternatively, the measurement probe outputs all or most of the probe measurement data to an associated checking unit and the step of monitoring any probe measurement data is carried out by said associated checking unit. An interface or controller may comprise an associated checking unit. This method has the advantage that it is faster than the prior art methods described hereinbefore because a 3D representation of the object does not need to be calculated by combining the machine position and the probe measurement data.

Advantageously, where the measuring apparatus comprises a machine tool having a main processor for controlling machine tool operation, the step of indicating that the dimensions of the object do not conform to tolerance comprises feeding said indication to said main processor. This enables the main processor to decide the next action to take. If the object is oversized for example the main processor of the machine tool can maneuver the machine so as to re-machine the object.

Advantageously, a sensory output is provided somewhere on the probe or associated checking unit to indicate to the operator if the dimensions of the object do not conform to tolerance. The sensory output may be for example an LED or a buzzer.

The measurement probe may be a contact probe, for example a touch-trigger probe or an analogue probe, or a non-contact probe, such as a capacitance, inductance or optical probe.

Measuring apparatus used in the method of the present invention may include coordinate positioning apparatus such as, for example, dedicated coordinate measuring machines (CMMs), or machine tools such as lathes, machining centers etc.

Preferably, the step of driving the measurement probe around a path relative to the object is performed with the probe in 'rapid' mode, that is, as fast as the probe will travel without giving false measurement data.

Advantageously, the path relative to the object may include a first path only. In such an example, as the measurement probe is driven around said first path the probe measurement data must remain in one state for the object to be in tolerance. For the probe measurement data to remain in one state it must remain within a predetermined measurement data range; said range being dependent on at least one tolerance of the object. If the probe measurement data moves outside the specified range, changing the state of the probe measurement data, a signal is sent to indicate that the object does not conform to tolerance. Advantageously, such a method is used with contact probes, such as analogue probes, and non-contact probes, such as capacitance, inductance or optical probes.

Conveniently the path relative to the object may include a first path and a second path. Said first and second paths may be based on the maximum and minimum tolerance allowed dimensions of the object. The maximum tolerance allowed dimension is, for example for a cylinder, the maximum acceptable size of the cylinder. The minimum tolerance allowed dimension is for example for a cylinder, the minimum acceptable size of the cylinder. As the measurement probe is driven around the first path the probe measurement data must remain in a first specified state, and, as the probe is driven around the second path the probe measurement data must remain in a second specified state for the object to be in tolerance. This method may be used with contact probes, such as touch trigger and analogue probes, and non-contact probes such as capacitance, inductance or optical probes; it is best suited to touch trigger probes.

The method may comprise the additional step of rescanning a region of the object to find the exact position of a fault, if an initial scan signals a fault in said region. The rescanning step is preferably performed at a slower speed than the initial scan, in order to find more accurately the point at which the object failure occurred.

Preferred embodiments of the invention will now be described by way of example only, with reference to the accompanying drawings wherein:

FIG. 5b shows the variation in stylus deflection over time whilst scanning the bore in FIG. 5a;

Figure 1:
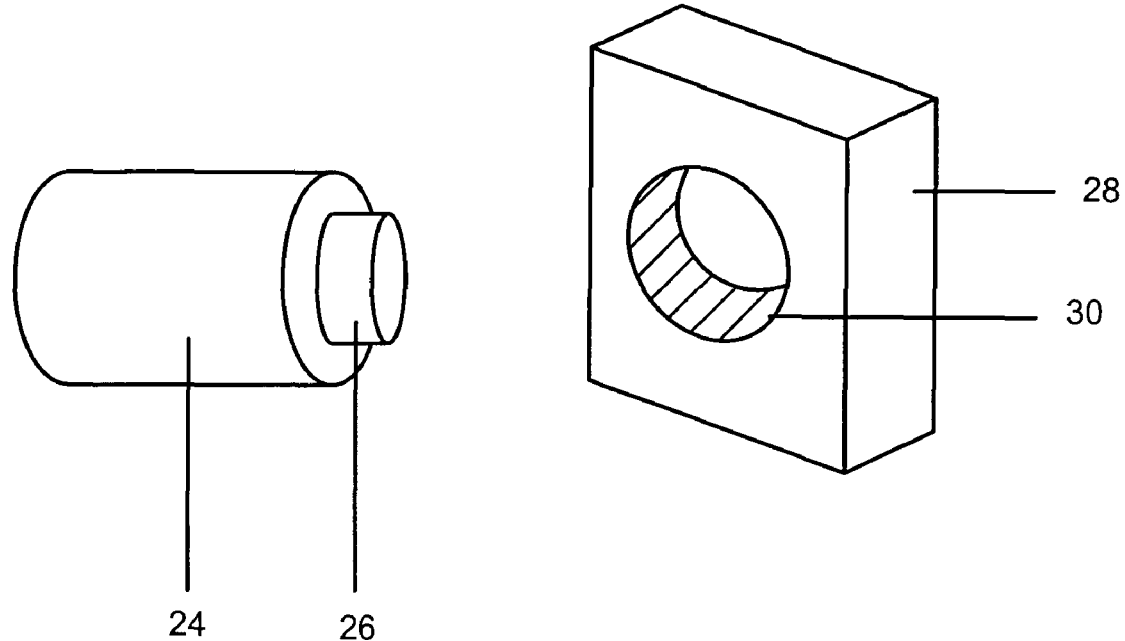
FIG. 1 shows a side on view of a prior art 'go, no-go' gauge block and an object with a feature to be tested by said gauge.
Figure 2:
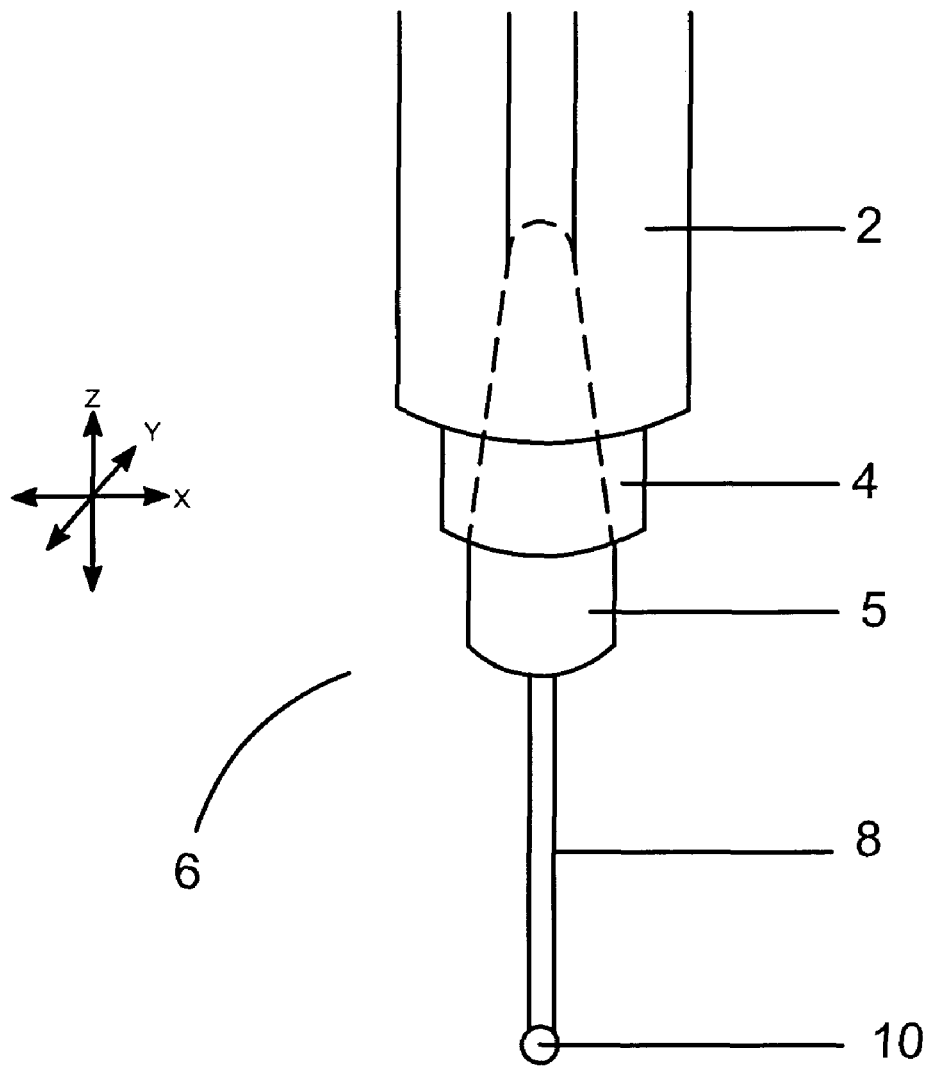
FIG. 2 shows schematically a probe mounted in a machine tool above a workpiece.
Figure 2:
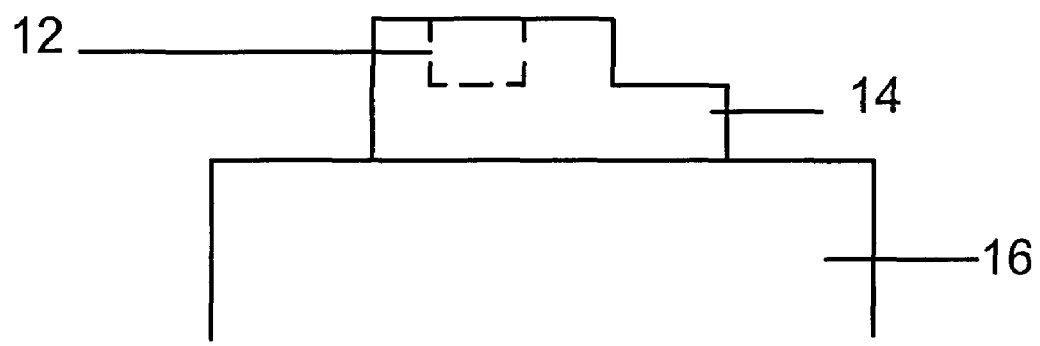

FIG. 2 of the accompanying drawings shows a workpiece set up on a machine tool. A measurement probe 6 is mounted on a spindle 2 of the machine and is held in place by the tool holder 4. This is the same position in which a cutting tool would be held whilst machining feature 12 on the workpiece 14. The probe comprises a probe body 5, a stylus 8, and a stylus tip 10. The workpiece 14 is mounted on the machine tool table 16.

In this instance the spindle 2 and measurement probe 6 may move in X, Y and Z directions under the action of X, Y and Z drives controlled by a computer, interface or machine controller, while the table remains stationary. X, Y and Z scales (which include counters for the outputs of the scales) show the instantaneous three-dimensional coordinates of the position of the spindle 2 on which the measurement probe 6 is mounted. Measurement readings sent from the measurement probe 6 are combined with readings from the X, Y and Z scales, allowing calculation of the position of the stylus tip and thus the surface of the workpiece.

Although a stationary table is shown, the machine tool may include a spindle and measurement probe that move only in the Z direction, with the table moving in X and Y with respect to it. Any combination resulting in three degrees of freedom in movement of the probe relative to the workpiece is possible.

Although machine tools are described above, other measuring apparatus could be used, for example dedicated CMMs, robots, and non-cartesian measuring machines.

Figure 3:
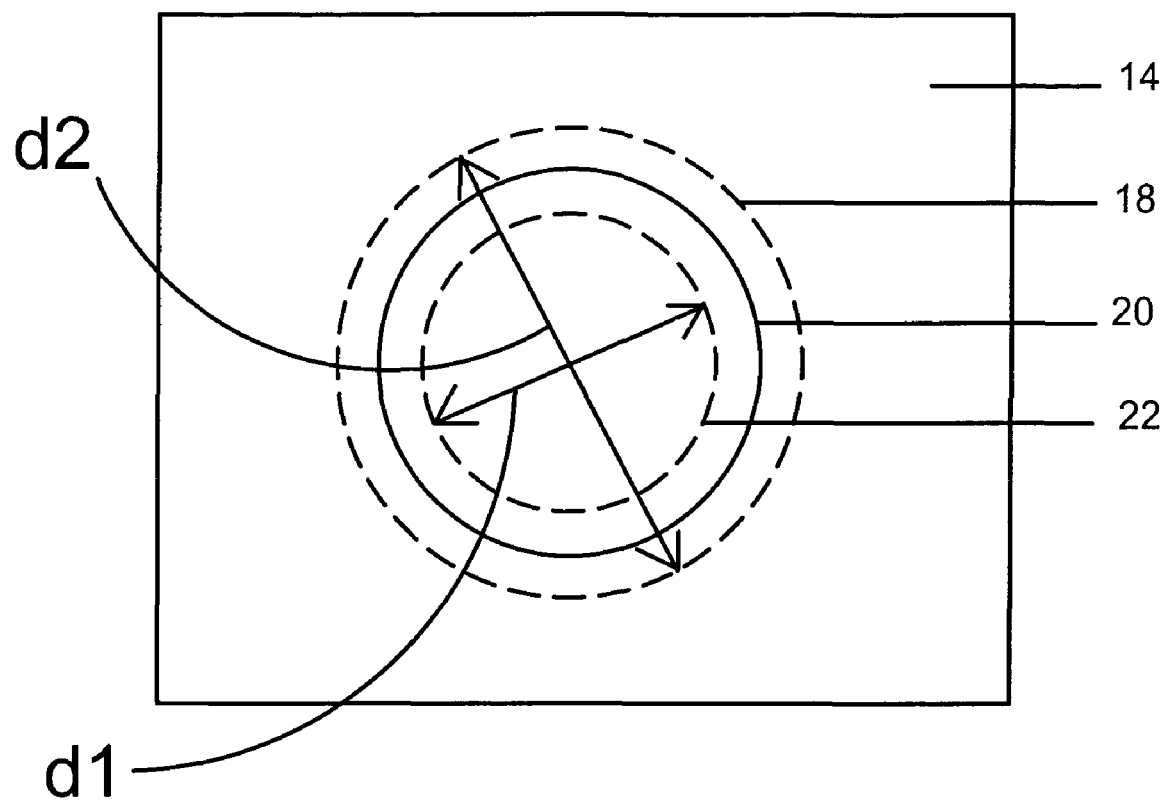
FIG. 3 shows a plan view of a workpiece having a bore.

FIG. 3 shows a plan view of a workpiece 14 comprising a machined bore 20. The apparatus described with reference to FIG. 2 can be used to check the tolerance of the bore.

When checking the bore 20 in 'go' mode the probe stylus is initially undeflected and is driven by a controller along a 'go' path 22 based on the smallest acceptable diameter d1 of the bore. If the probe stylus remains undeflected at all points on this path no signals are sent to the data capturing device (for example a machine controller) and the workpiece passes the 'go' inspection. If the stylus is deflected at any point along the 'go' path the machine latches at that point, recording the XYZ position of the probe deflection; the bore has a diameter smaller than the smallest acceptable diameter d1 and the workpiece fails the 'go' tolerance test.

In this case, passing the 'go' inspection means that the diameter of the bore is greater than the smallest diameter specified by the tolerance. If a workpiece fails the 'go' inspection it may be machined further and checked again.

When checking the bore 20 in 'no go' mode the probe stylus is initially deflected against the bore surface and driven by a controller around a 'no-go' path 18 based on the largest acceptable diameter d2 of the bore. The 'no-go' path is chosen such that the reseat position of the stylus is outside the tolerance. If the stylus remains deflected at all points on the path no signals are sent and the workpiece passes the 'no-go' inspection. If the stylus reseats, i.e. the stylus becomes undeflected, during its course the machine latches at that point, recording the XYZ position of the stylus reseating. The workpiece fails the 'no-go' tolerance test.

In this case, passing the 'no-go' inspection means that the diameter of the bore is smaller than the largest diameter specified by the tolerance. If a workpiece fails the 'no-go' inspection the workpiece should be rejected.

The maximum and minimum dimensions of a workpiece can be calculated by adding and subtracting the tolerance from the known desired surface profile of the workpiece.

This embodiment of the method is best suited to use with a touch trigger probe, as described above. An analogue probe may be used in the same way as the touch trigger probe when following this embodiment of the method, i.e. by driving the probe around two paths, one in which the probe must stay deflected (i.e. the deflection of the probe is greater than an upper limit) for the workpiece to be in tolerance and the other in which the probe must stay undeflected (i.e. the deflection of the probe must be smaller than a lower limit) for the workpiece to be in tolerance.

This embodiment is also suitable for use with non-contact probes such as optical, capacitance and inductance probes. In this case the distance of the workpiece from the probe is measured at points along the path. Following a 'go' path, if the distance reading remains above a defined level (i.e. the workpiece is further away from the probe than the tolerance limit) the workpiece will pass the 'go' test, however if the distance reading drops below said defined level the part will fail the 'go' test. Following a 'no-go' path, if the distance reading remains below a defined level (i.e. the workpiece is closer to the probe than the tolerance limit) the workpiece will pass the 'no-go' test, however if the distance reading rises above said defined level the part will fail the 'no-go' test. In each case the defined level separates the two states (e.g. triggered and not triggered) of the probe.

Figure 4A:
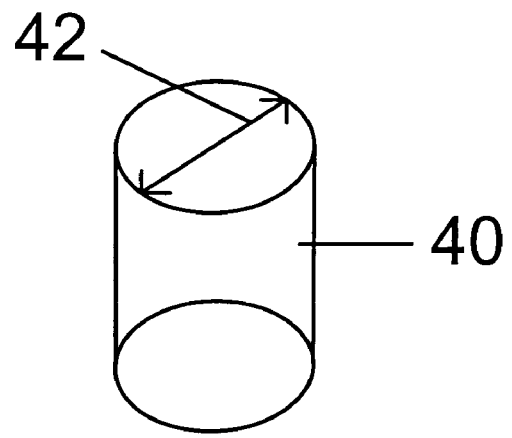
FIG. 4a shows a perspective view of a cylinder and FIG. 4b shows a plan view of the cylinder.
Figure 4B:
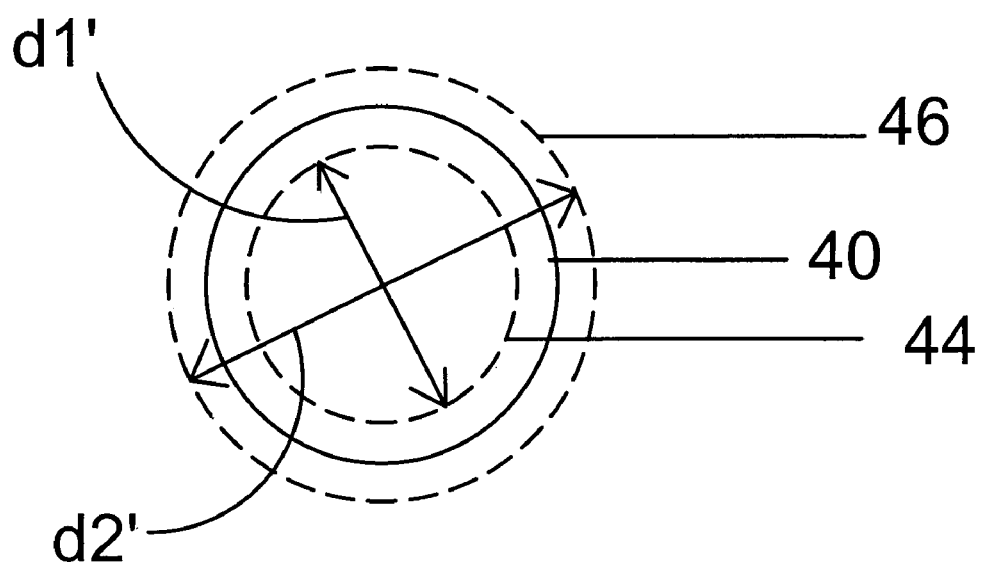

The 'go' and 'no-go' paths are reversed from bores to bosses. FIG. 4a shows a workpiece 40, which is a cylinder of nominal diameter 42. FIG. 4b shows a plan view of the cylinder, indicating the tolerance limits of its diameter. In this case the path 44 describing the smallest acceptable diameter d1' of the cylinder forms the 'no-go' path, whilst the path 46 describing the largest acceptable diameter d2' of the cylinder forms the 'go' path.

Figure 5A:
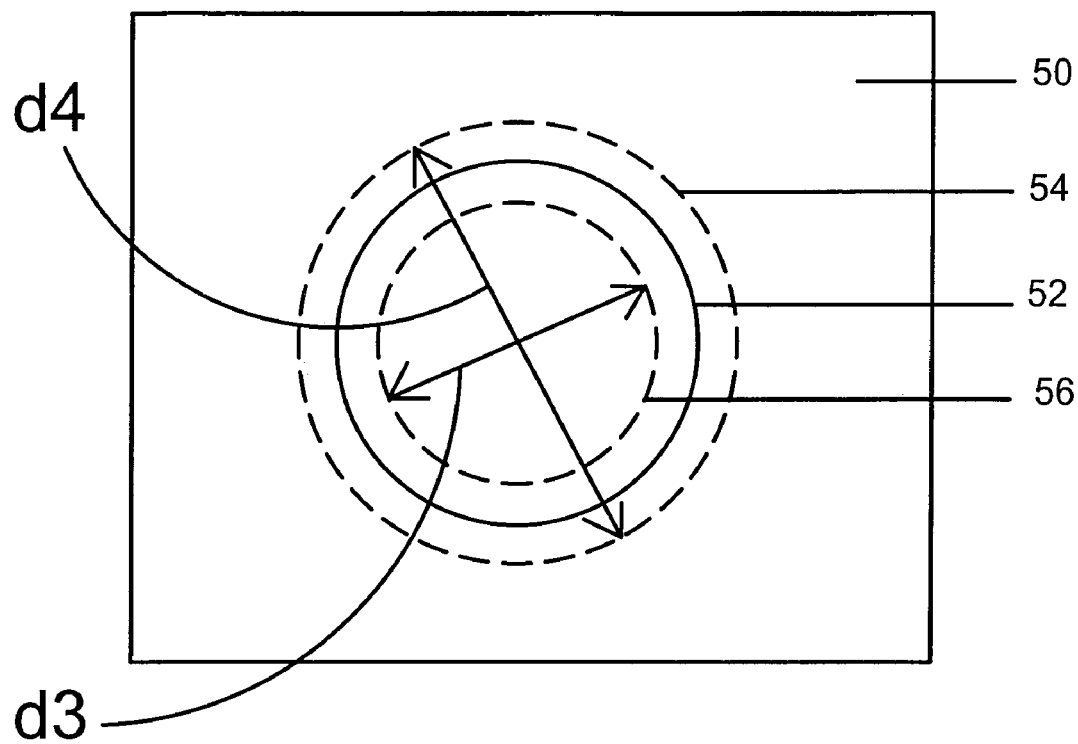
FIG. 5a shows a plan view of a workpiece having a bore.
Figure 5B:
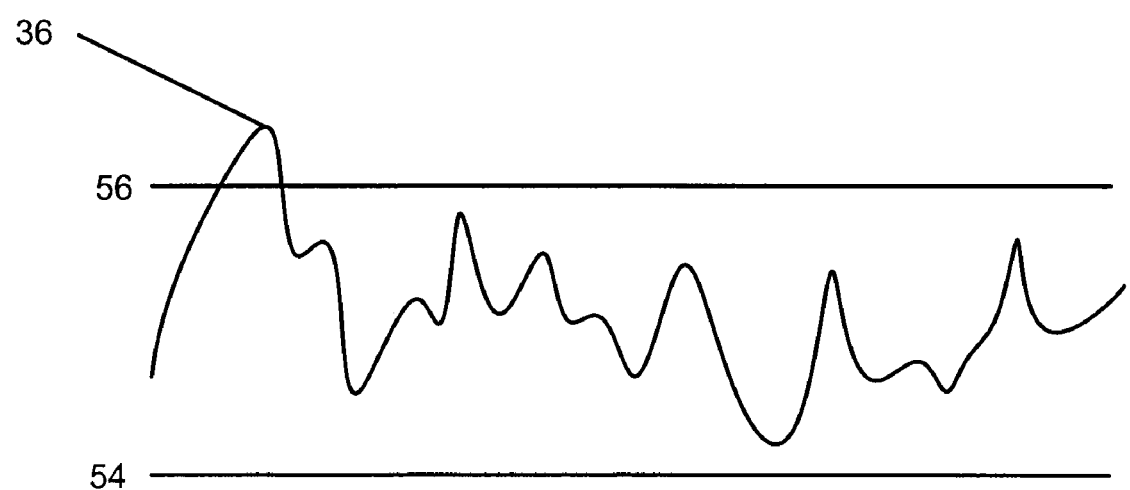

Referring to FIG. 5, a further method of the invention is shown. FIG. 5a shows a workpiece 50 having a bore 52, whilst FIG. 5b shows the variation in stylus deflection over time whilst scanning a workpiece. In this example the probe stylus is assigned maximum 56 and minimum 54 deflections which correspond to the minimum d3 and maximum d4 tolerance diameters of the bore 52 respectively. If the probe stylus deflections remain within the range 54-56 whilst the probe is driven around a path, then the workpiece is within tolerance and passes the inspection. If the probe stylus is deflected above the upper limit 56 (as at 36), the machine will latch and send a signal to a machine controller indicating that the workpiece requires more machining. If the probe stylus is deflected below the lower limit 54, the machine will latch and send a signal to indicate that the workpiece should be rejected.

For a cylinder, the minimum acceptable cylinder diameter can be assigned a minimum acceptable deflection and the maximum acceptable cylinder diameter is consequently assigned a maximum allowable deflection. Again, if the probe stylus is deflected above the upper limit 56, the machine will latch and send a signal to a machine controller indicating that the workpiece requires more machining. If the probe stylus is deflected below the lower limit 54, the machine will latch and send a signal to indicate that the workpiece should be rejected.

This method can be carried out using an analogue probe, as described above. The method is also suitable for non-contact probes, for example optical, inductance and capacitance probes. Such probes measure the distance of the workpiece form the probe. Upper and lower distances are set, corresponding to the tolerance limits, to define the tolerance permitted range of probe outputs. The machine will latch and a signal will be sent only if the probe output falls outside of the permitted range.

The method of determining whether the dimensions of a workpiece conform to tolerance may comprise the additional step of rescanning a region of the workpiece. If the initial scan signals a fault in a given region, the scan can be repeated in that region at a slower speed, enabling more accurate determination of the point at which the workpiece failure occurred.

Other types of machined features, which may be checked for tolerance adherence using the invention, include for example, corners, chamfers and straight edges.

Figure 6A:
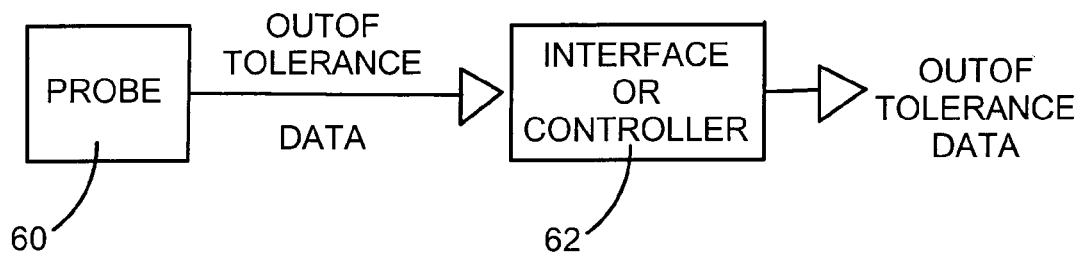
FIG. 6a is a flow diagram showing the out of tolerance data output by the probe.
Figure 6B:
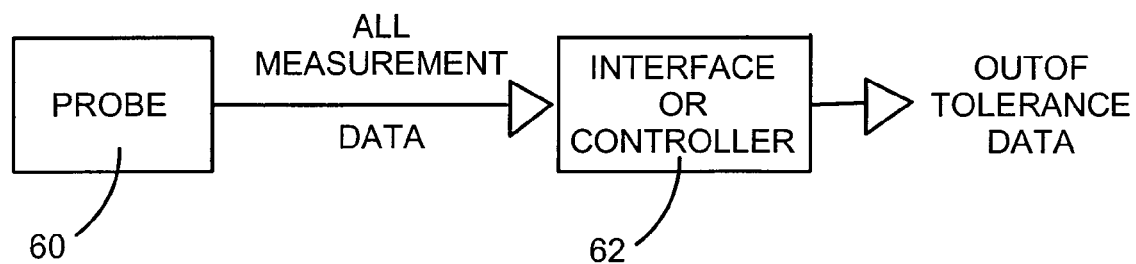
FIG. 6b is a flow diagram showing the out of tolerance data output by an interface or controller.

FIG. 6a is a flow diagram illustrating a method according to the invention in which the probe 60 outputs only out of tolerance data to the interface or controller 62. FIG. 6b is a flow diagram illustrating the probe 60 outputting all the measurement data to an interface or controller 62.

The example described above with respect to FIGS. 2-5 involves signals being sent from the probe to the controller/interface only when the workpiece is out of tolerance, as shown in the flow diagram of FIG. 6a.

Alternatively the probe may send signals to the controller/interface at all points along its path, and the controller/interface may send a signal to a machine controller or interface if the dimensions of the workpiece do not conform to tolerance; this is shown in the flow diagram of FIG. 6b. In this case, only the out of tolerance data is output by the interface or controller 62.

The invention claimed is:

1. A method of determining whether the dimensions of an object conform to tolerance using a measurement probe on a measuring apparatus comprising the steps of:
    driving the measurement probe around a path relative to the object, said path being based on a tolerance of the object;
    monitoring any probe measurement data acquired by the measurement probe as said probe is driven around the path; and
    indicating if the dimensions of the object do not conform to tolerance only if there is a change in state of the probe measurement data that is acquired as said measurement probe is driven around said path.

2. A method according to claim 1 wherein the measuring apparatus is coordinate positioning apparatus.

3. A method according to claim 1 wherein the path relative to the object includes at least a first path and a second path, said first and second paths being based on the maximum and minimum tolerance allowed dimensions of the object respectively.

4. A method according to claim 1 wherein the measurement probe is a touch trigger probe.

5. A method according to claim 4 wherein the change in state of the probe measurement data acquired by the measurement probe is a change between the deflected and undeflected probe conditions.

6. A method according to claim 1 wherein the path relative to the object includes only a first path.

7. A method according to claim 1 wherein the measurement probe is an analogue probe.

8. A method according to claim 1 wherein the measurement probe is a non-contact probe.

9. A method according to claim 7 wherein the change in state of the probe measurement data occurs when the probe measurement data crosses a predetermined measurement value threshold.

10. A method according to claim 9 wherein said predetermined measurement value threshold is dependent on at least one tolerance of the object.

11. A method according to claim 7 wherein the change in state of the probe measurement data occurs when the probe measurement data changes from within a predetermined measurement range to outside of that range.

12. A method according to claim 11 wherein said predetermined measurement range is dependent on at least one tolerance of the object.

13. A method according to claim 1 wherein the measurement probe comprises a checking unit for performing the step of monitoring probe measurement data acquired by the measurement probe as said probe is driven around said path.

14. A method according to claim 1 in which the measurement probe outputs probe measurement data to an associated checking unit, wherein the step of monitoring any probe measurement data is carried out by said associated checking unit.

15. A method according to claim 14 wherein at least one of an interface and a controller comprises the associated checking unit.

16. A method according to claim 1 wherein the step of driving the measurement probe around a path relative to the object is performed with the probe traveling as fast as possible without giving false measurement data.

17. A method according to claim 1 wherein the method comprises the additional step of rescanning a region of the object to find the exact position of a fault, if an initial scan signals a fault in said region.

18. A method according to claim 17 wherein the step of rescanning a region of the object is performed at a slower speed than the initial scan.

19. A method according to claim 1 comprising the step of providing a sensory output to indicate to an operator if the dimensions of the object do not conform to tolerance.

20. A method according to claim 1 wherein the measuring apparatus comprises a machine tool having a main processor for controlling machine tool operation and the step of indicating that the dimensions of the object do not conform to tolerance comprises feeding said indication to said main processor.

* * * * *